US012574461B1

(12) United States Patent
    Gutierrez Keever et al.

(10) Patent No.: US 12,574,461 B1
(45) Date of Patent: Mar. 10, 2026

(54) ADAPTIVE VOICEMAIL AND IVR DETECTION FOR AI-DRIVEN CALL AUTOMATION

(71) Applicant: Wishpond Technologies Ltd., Vancouver (CA)

(72) Inventors: Alabin Jordan Carel Gutierrez Keever, North Vancouver (CA); Ali Tajskandar, North Vancouver (CA); Bikram Singh, Port Coquitlam (CA); Amir Ali Pourjabbari, Vancouver (CA); Kara Raquel Kruzeniski, White Rock (CA)

(73) Assignee: WISHPOND TECHNOLOGIES LTD., Vancouver (CA)

( * ) Notice: Subject to any disclaimer, the term of this patent is extended or adjusted under 35 U.S.C. 154(b) by 0 days.

(21) Appl. No.: 19/311,396

(22) Filed: Aug. 27, 2025

(51) Int. Cl.
    *H04M 3/533* (2006.01)
    *G10L 15/26* (2006.01)
    *H04M 3/493* (2006.01)

(52) U.S. Cl.
    CPC ............. *H04M 3/533* (2013.01); *G10L 15/26* (2013.01); *H04M 3/493* (2013.01)

(58) Field of Classification Search
    CPC ........ H04M 3/533; H04M 3/493; G10L 15/26
    See application file for complete search history.

(56) References Cited

U.S. PATENT DOCUMENTS

| | | | |
|---|---|---|---|
| 9,400,790 B2 * | 7/2016 | Yasrebi | ................ G06F 16/437 |
| 11,146,686 B1 | 10/2021 | Benkreira et al. | |
| 11,303,749 B1 | 4/2022 | Baror et al. | |
| 2011/0137918 A1 * | 6/2011 | Yasrebi | ................... G06F 16/51 704/235 |
| 2024/0412720 A1 * | 12/2024 | Vasylyev | ......... G06F 16/90332 |
| 2025/0308531 A1 * | 10/2025 | Alqurishi | ......... H04M 3/42221 |

* cited by examiner

*Primary Examiner* — Matthew D. Anderson
*Assistant Examiner* — Dung L Lam
(74) *Attorney, Agent, or Firm* — Jason A. Smith; Shumaker, Loop & Kendrick, LLP

(57) ABSTRACT

The present disclosure provides a system for adaptive voicemail and interactive voice response (IVR) detection in outbound calls. The system includes a call initialization module configured to establish an outbound call connection, a speech processing module configured to convert incoming audio signals into text in real-time, a classification module configured to analyze the text and determine whether the call has reached a live recipient, a voicemail system, or an IVR menu, a decision-making module configured to determine an appropriate course of action based on the classification, and a response generation module configured to generate and deliver appropriate responses based on the determined course of action. The system enables efficient handling of outbound calls by accurately detecting and responding to different call scenarios.

15 Claims, 4 Drawing Sheets

400

ADAPTIVE VOICEMAIL AND IVR DETECTION FOR AI-DRIVEN CALL AUTOMATION

FIELD OF INVENTION

The present disclosure relates to artificial intelligence-driven call automation systems, and more particularly to adaptive voicemail and interactive voice response (IVR) detection for improving outbound call efficiency and accuracy.

BACKGROUND

AI-driven outbound call agents frequently encounter voicemail systems and Interactive Voice Response (IVR) menus, which introduce challenges for call automation. Existing call automation solutions struggle to accurately differentiate between live recipients, voicemail recordings, and IVR systems, leading to inefficiencies and unnatural interactions.

Current approaches to addressing this issue often rely on simplistic audio cues, predefined call dispositions, or fixed delay timers. These methods typically operate by assuming voicemail has been reached if no response is detected within a set timeframe, or by attempting basic DTMF recognition for IVR menus. However, such techniques fail when voicemail greetings vary in length or tone, and lack intelligent decision-making capabilities for navigating complex IVR trees.

These existing solutions have several shortcomings. They frequently misclassify calls, mistaking voicemail greetings for live recipients or prematurely delivering messages before greetings finish. Many systems lack the ability to dynamically adapt to different voicemail patterns or IVR menu structures. Additionally, current approaches often result in AI agents getting stuck in IVR loops or falsely logging unproductive call attempts as lead interactions. There is a need for more sophisticated, adaptive techniques to improve the accuracy and efficiency of automated outbound calling systems.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for adaptive outbound call handling may be provided. The method may include capturing audio of a voice call established between a calling system and a called endpoint and dividing the audio into successive frames. The method may assign a speech-recognition confidence value to each frame and discard frames having confidence values below a configurable threshold prior to further processing. The method may verify that a transmission queue is free of system-generated outbound audio and, upon that verification, convert remaining frames into text and classify the voice call as voicemail, interactive voice response, or live human speech by executing a machine-learning language model on the text. The method may select a corresponding call-handling action in dependence on the classification. When the classification identifies the interactive voice-response state, the method may generate, in real time, control inputs derived from a stored menu-navigation policy that at least maps recognised menu wording to dual-tone-multi-frequency sequences, updates the mapping in response to menu transitions detected in the inbound audio, and continues to issue updated control inputs until detection of live-speaker pickup. The method may execute the selected call-handling action, which may further comprise delivering a prerecorded voicemail message when the classification identifies the voicemail state and continuing conversational interaction when the classification identifies the live-speaker state.

According to other aspects of the present disclosure, the configurable threshold for discarding frames may be adjustable based on ambient noise levels detected in the audio. The method may use a speech-to-text engine trained on telephony audio data for converting remaining frames into text. The machine-learning language model may be a transformer-based model fine-tuned on labeled examples of voicemail greetings, IVR prompts, and live human speech. The method may include logging call outcomes and updating the stored menu-navigation policy based on successful navigation patterns. The control inputs for interactive voice response navigation may include DTMF tones and synthesized speech responses. The method may detect silence periods in the audio and use the detected silence periods to determine appropriate timing for delivering the prerecorded voicemail message. Continuing conversational interaction may comprise activating a natural language processing module to engage in dialogue with the live speaker. The method may update the classification in real-time as the call progresses, allowing for dynamic switching between call-handling actions.

According to another aspect of the present disclosure, a system for adaptive outbound call handling may be provided. The system may include at least one processor and a memory storing instructions that, when executed by the at least one processor, cause the system to perform operations similar to those described in the method above. The system may include a telephony interface for establishing the voice call with the called endpoint. The memory may further store a database of prerecorded voicemail messages selectable based on call context. The system may include a user interface for configuring the stored menu-navigation policy.

According to yet another aspect of the present disclosure, a non-transitory computer-readable storage medium may store instructions that, when executed by at least one processor of a computing system, cause the computing system to perform operations similar to those described in the method above. The instructions may further cause the computing system to perform real-time analytics on call outcomes and adjust call-handling strategies based on the analytics.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to an adaptive voicemail and Interactive Voice Response (IVR) detection system for AI-driven call automation. This system may address challenges faced by automated outbound calling systems in accurately differentiating between live recipients, voicemail recordings, and IVR systems.

The Adaptive Voicemail and IVR Detection System may be implemented as a computer-based system comprising at least one processor and a memory storing instructions. In some cases, the system may include a telephony interface for establishing voice calls with called endpoints. The system may also incorporate a database containing prerecorded voicemail messages that can be selectively utilized based on call context or other parameters.

In some implementations, the Adaptive Voicemail and IVR Detection System may feature a user interface allowing configuration of a menu-navigation policy. This policy may guide the system's interactions with Interactive Voice Response (IVR) systems encountered during outbound calls.

The outbound call handling process may be embodied as a set of instructions stored on a non-transitory computer-readable storage medium. When executed by the at least one processor, these instructions may cause the system to perform various adaptive call handling functions.

By leveraging these components and capabilities, the Adaptive Voicemail and IVR Detection System may enhance the efficiency and accuracy of outbound calling operations. The system may dynamically adapt to different call scenarios, potentially improving the overall effectiveness of automated communication processes.

Figure 1:
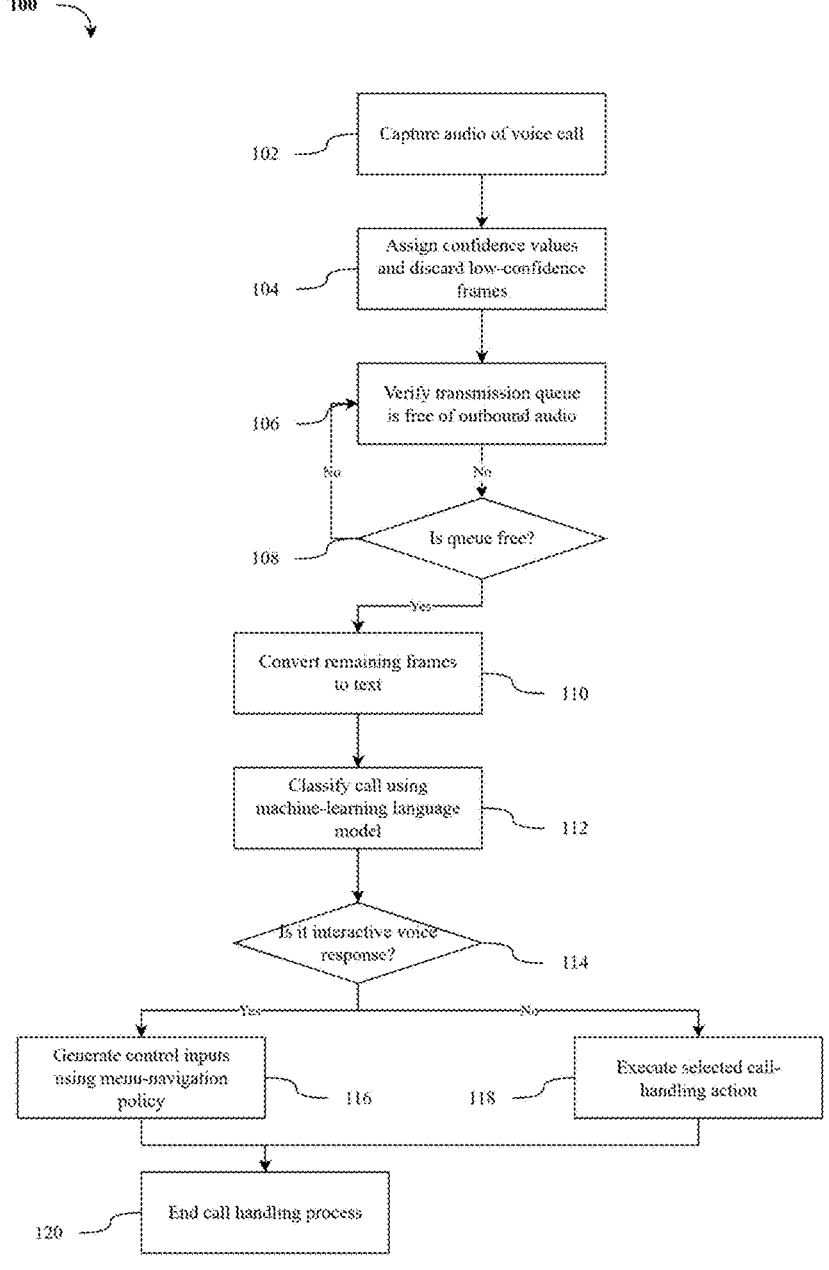
FIG. 1 illustrates a flowchart for an adaptive outbound call handling method, according to aspects of the present disclosure.

The adaptive outbound call handling method may be implemented as illustrated in FIG. 1. The method may begin with a step 100 of capturing audio of a voice call. In some cases, the captured audio may be divided into successive frames for processing.

Following the audio capture, a step 102 may involve assigning speech-recognition confidence values to each frame. Frames having confidence values below a configurable threshold may be discarded prior to further processing. This step may help filter out low-quality or unreliable audio data.

The method may then proceed to a step 104 where the system verifies that a transmission queue is free of system-generated outbound audio. This verification may ensure that the system is ready to process incoming audio without interference from its own outgoing transmissions.

A decision point 106 may follow, where the method determines if the queue is indeed free. If the queue is not free, the process may loop back to step 104 to recheck the queue status. When the queue is confirmed to be free, the method may advance to a step 108.

In step 108, the remaining frames that were not discarded in step 102 may be converted into text. This text conversion may facilitate further analysis and classification of the call content.

A step 110 may then involve classifying the voice call using a machine-learning language model. The classification may categorize the call as voicemail, interactive voice response, or live human speech based on the converted text.

Following the classification, a decision point 112 may determine if the call involves an interactive voice response system. If the call is identified as an interactive voice response, the method may proceed to a step 114. In step 114, control inputs may be generated using a menu-navigation policy. These control inputs may be designed to navigate through the interactive voice response system.

If the call is not identified as an interactive voice response at decision point 112, or after completing step 114, the method may move to a step 116. In step 116, a selected call-handling action may be executed. The selection of this action may be based on the classification determined in step 110.

In some cases, when the classification identifies a voicemail state, the call-handling action may involve delivering a prerecorded voicemail message. When live human speech is detected, the call-handling action may involve continuing conversational interaction.

The method may conclude with a step 118, which ends the call handling process. This step may involve terminating the call, logging the call outcome, or transitioning to another process as appropriate.

By following this adaptive outbound call handling method, the system may efficiently process and respond to various types of voice calls, adapting its behavior based on real-time analysis of the call content.

Figure 2:
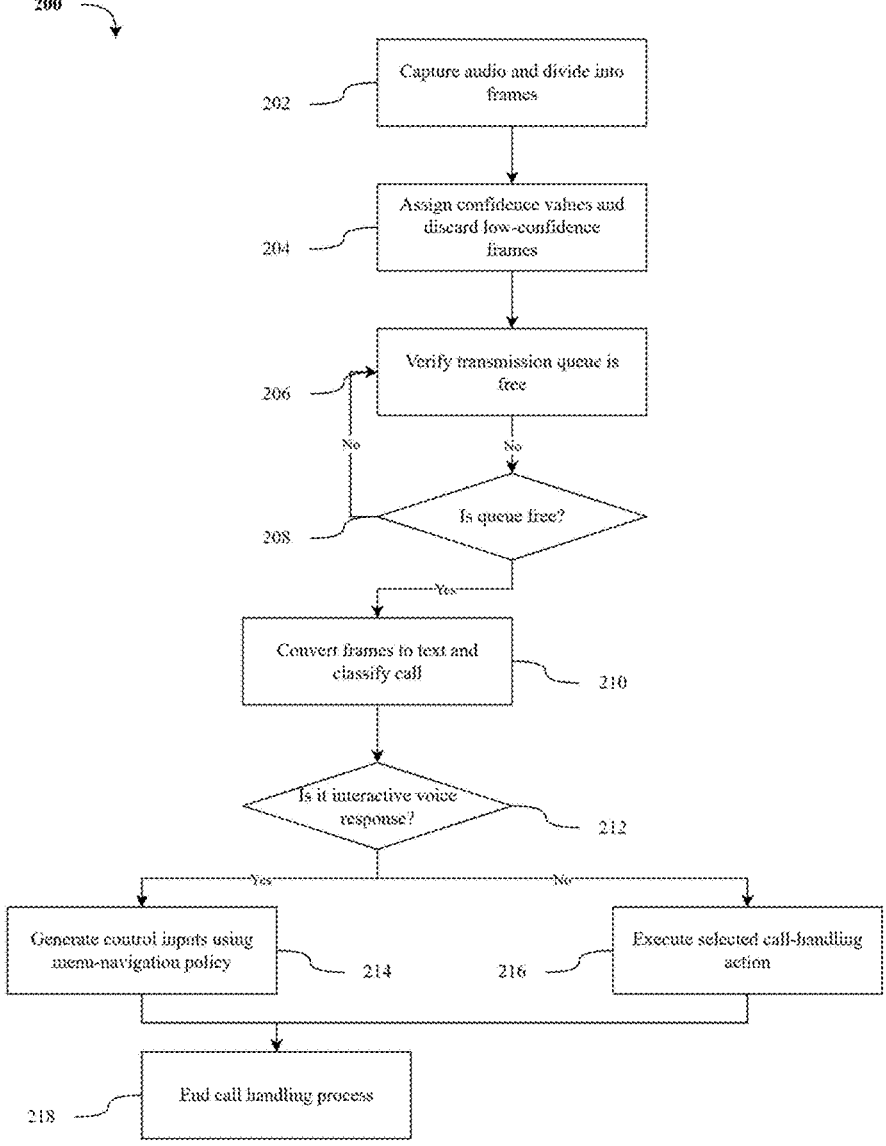
FIG. 2 depicts a flowchart for an adaptive outbound call handling process, in accordance with example embodiments.

FIG. 2 illustrates an adaptive outbound call handling process. The process may begin with a step 200 of capturing audio and dividing the audio into frames. This step may be similar to the audio capture step 100 in FIG. 1, but explicitly mentions the frame division process.

A step 202 may involve assigning confidence values and discarding low-confidence frames. This step may correspond to step 102 in FIG. 1, but provides more specific language about the confidence value assignment and frame discarding process.

The process may then proceed to a step 204 where the system verifies if the transmission queue is free. This step may be analogous to step 104 in FIG. 1, ensuring that the system is ready to process incoming audio without interference from outgoing transmissions.

A decision point 206 may follow, determining if the queue is free. If the queue is not free, the process may loop back to step 204 to recheck the queue status. When the queue is confirmed to be free, the process may advance to a step 208.

In step 208, the remaining frames may be converted to text and the call may be classified. This step may combine the text conversion (step 108 in FIG. 1) and call classification (step 110 in FIG. 1) into a single step, potentially indicating a more integrated approach to these processes.

A decision point 210 may then determine if the call involves interactive voice response. This decision point may be similar to decision point 112 in FIG. 1, but uses slightly different terminology.

If the call is identified as involving interactive voice response, the process may proceed to a step 212. In step 212, control inputs may be generated using a menu-navigation policy. This step may correspond to step 114 in FIG. 1, but provides more specific language about the use of a menu-navigation policy.

If the call is not identified as involving interactive voice response at decision point 210, or after completing step 212, the process may move to a step 214. In step 214, a selected call-handling action may be executed. This step may be analogous to step 116 in FIG. 1.

The process may conclude with a step 216, which ends the call handling process. This step may correspond to step 118 in FIG. 1.

In some cases, the menu-navigation policy used in step 212 may map recognised menu wording to dual-tone multi-frequency (DTMF) sequences. The menu-navigation policy may update based on detected menu transitions, allowing the system to adapt to changes in IVR menu structures.

The classification performed in step 208 may be updated in real-time as the call progresses. This real-time updating may allow for dynamic switching between call-handling actions, enabling the system to adapt to changes in the call state.

In some implementations, the outbound call handling process may include logging call outcomes. These logged outcomes may be used to update the menu-navigation policy, potentially improving the system's performance over time.

The control inputs generated in step 212 for interactive voice response handling may include DTMF tones and synthesized speech responses. This combination of input types may allow the system to navigate a wide range of IVR systems effectively.

When the call-handling action executed in step 214 involves delivering a voicemail message, the system may detect silence periods in the audio. These detected silence periods may be used to determine appropriate timing for delivering the voicemail message, potentially improving the natural flow of the interaction.

In cases where step 214 involves continuing a live conversation, the system may activate a natural language processing module. This module may enable the system to engage in dialogue with the live speaker, potentially allowing for more complex and nuanced interactions.

By incorporating these adaptive elements and real-time processing capabilities, the outbound call handling process illustrated in FIG. 2 may provide a flexible and efficient approach to managing various types of outbound calls.

Figure 3:
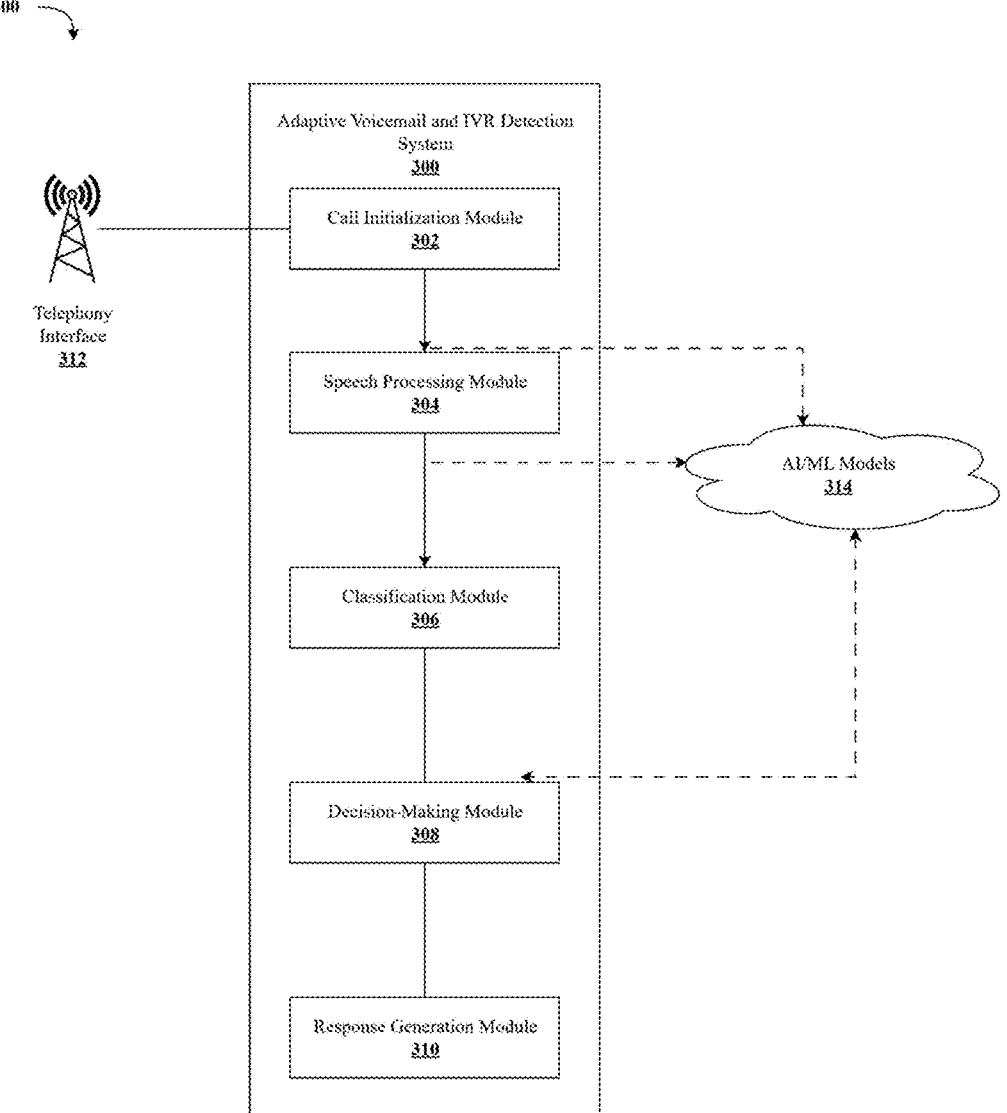
FIG. 3 shows a system diagram of an Adaptive Voicemail and IVR Detection System, according to an embodiment.

FIG. 3 illustrates an Adaptive Voicemail and IVR Detection System 300. The Adaptive Voicemail and IVR Detection System 300 may comprise several interconnected modules that work together to process and respond to incoming calls.

A Call Initialization Module 302 may receive incoming calls through a Telephony Interface 312. In some cases, the Telephony Interface 312 may utilize Twilio with websockets for streaming audio in both directions. This configuration may allow for real-time audio processing and response generation.

The Call Initialization Module 302 may be connected to a Speech Processing Module 304. The Speech Processing Module 304 may process the audio input from the call. In some implementations, the Speech Processing Module 304 may employ Google speech-to-text for real-time transcription of the incoming audio.

The Speech Processing Module 304 may be linked to a Classification Module 306. The Classification Module 306 may analyze the processed speech to determine the nature of the call. In some cases, the Classification Module 306 may use LLama-3 for detecting whether the call is an IVR system, a voicemail greeting, or live speech.

The Classification Module 306 may connect to a Decision-Making Module 308. The Decision-Making Module 308 may determine appropriate actions based on the classification results. In some implementations, the Decision-Making Module 308 may wait for 4 transcriptions before making a classification. This approach may help ensure a more accurate determination of the call type.

The Decision-Making Module 308 may be connected to a Response Generation Module 310. The Response Generation Module 310 may create suitable responses to the incoming call based on the decisions made by the Decision-Making Module 308. In some cases, the Response Generation Module 310 may use merge tags to customize voicemail messages with lead information, allowing for personalized responses.

The Adaptive Voicemail and IVR Detection System 300 may also include an AI/ML Models component 314. The AI/ML Models 314 may have bidirectional connections to the Speech Processing Module 304, Classification Module 306, and Decision-Making Module 308. These connections may indicate that these modules utilize AI and machine learning capabilities in their operations. In some implementations, the AI/ML Models 314 may include a capability to support automated IVR navigation, potentially allowing the system to interact with complex IVR menus.

The components of the Adaptive Voicemail and IVR Detection System 300 may be interconnected with solid lines, representing direct connections and data flow between modules. The dashed lines between the AI/ML Models 314 and other components may indicate a more flexible or indirect relationship, possibly representing the use of shared models or algorithms across different stages of the call processing pipeline.

By integrating these various modules and leveraging advanced AI and machine learning techniques, the Adaptive Voicemail and IVR Detection System 300 may provide a comprehensive solution for handling diverse call scenarios, from voicemail detection to IVR navigation and live conversation management.

Figure 4:
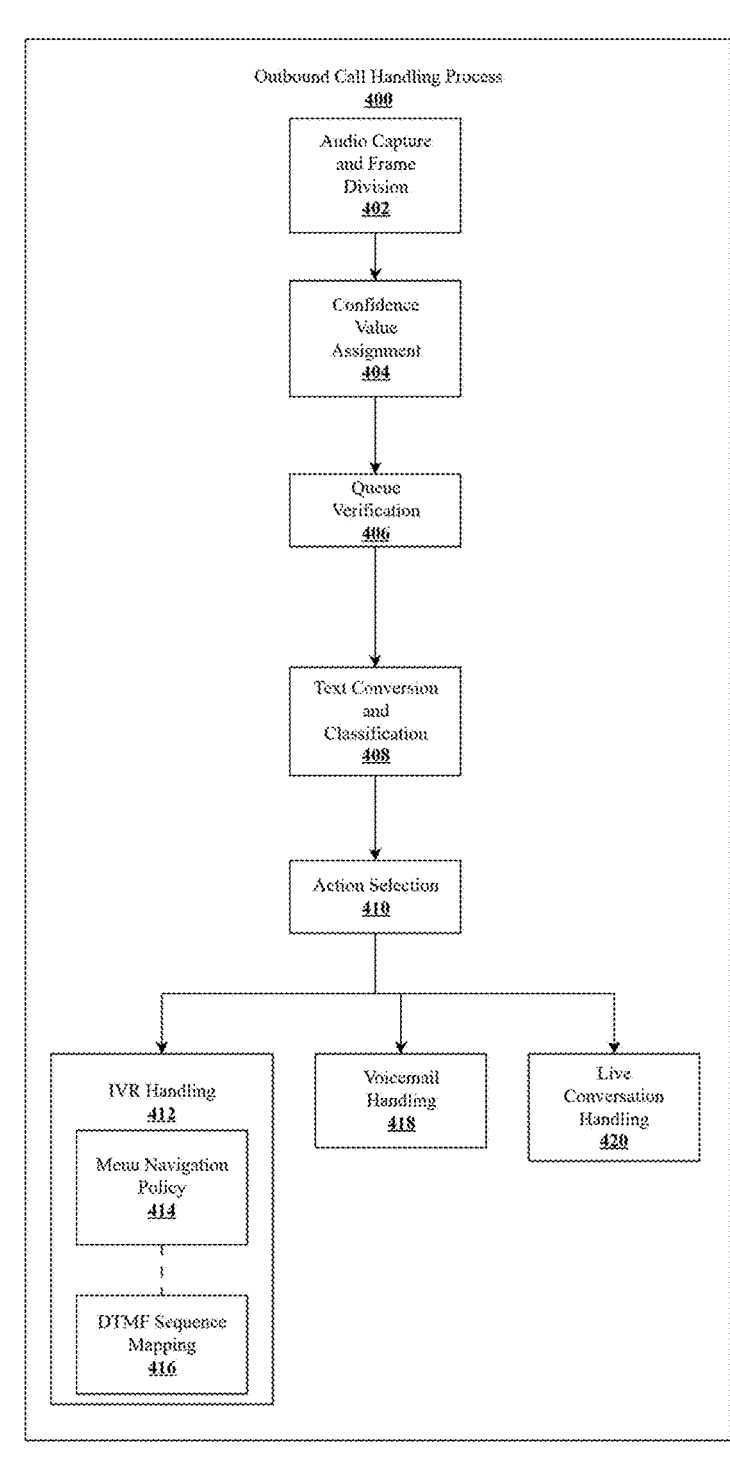
FIG. 4 illustrates a system diagram of an outbound call handling process, according to aspects of the present disclosure.

FIG. 4 illustrates an outbound call handling process 400. The outbound call handling process 400 may comprise several interconnected components that work together to process and manage outbound calls.

An audio capture and frame division component 402 may capture audio of a voice call and divide the audio into successive frames. In some cases, the audio capture and frame division component 402 may process incoming audio signals from a telephony interface.

A confidence value assignment module 404 may connect to the audio capture and frame division component 402. The confidence value assignment module 404 may assign speech-recognition confidence values to the processed audio frames. In some implementations, the confidence value assignment module 404 may discard frames having confidence values below a configurable threshold. The configurable threshold may be adjustable based on detected ambient noise levels in the audio.

A queue verification component 406 may verify the status of the call queue. The queue verification component 406 may ensure that the transmission queue is free of system-generated outbound audio before proceeding with further processing.

A text conversion and classification module 408 may follow the queue verification component 406. The text conversion and classification module 408 may convert the remaining audio frames into text and classify the voice call. In some cases, the text conversion and classification module 408 may use a speech-to-text engine trained on telephony audio data for the text conversion process. The classification may involve categorizing the call as voicemail, interactive voice response, or live human speech. In some implementations, the text conversion and classification module 408 may employ a machine-learning language model for classification. The machine-learning language model may be a transformer-based model fine-tuned on labeled examples of voicemail greetings, IVR prompts, and live human speech.

An action selection component 410 may determine the appropriate action based on the classified text. The action selection component 410 may direct the process flow to one of three handling modules: IVR handling 412, voicemail handling 418, or live conversation handling 420.

The IVR handling module 412 may include two sub-components: a menu navigation policy 414 and a DTMF sequence mapping 416. The menu navigation policy 414 and DTMF sequence mapping 416 may be connected by a dashed line, indicating a potential relationship or interaction between these sub-components. In some cases, the menu navigation policy 414 may guide the system's interactions with IVR systems encountered during outbound calls. The DTMF sequence mapping 416 may translate recognized menu options into appropriate dual-tone multi-frequency signals for navigating IVR menus.

The voicemail handling module 418 may manage interactions when the call is classified as reaching a voicemail system. In some implementations, the voicemail handling module 418 may control the delivery of prerecorded voicemail messages.

The live conversation handling module 420 may manage interactions when the call is classified as reaching a live human speaker. In some cases, the live conversation handling module 420 may activate natural language processing capabilities to engage in dialogue with the live speaker.

By integrating these components, the outbound call handling process 400 may provide a comprehensive approach to managing various types of outbound calls, adapting its behavior based on real-time analysis of the call content and classification results.

In some cases, the system may employ real-time speech analysis and dynamic response logic to enhance the efficiency and effectiveness of automated calls. The system may be capable of detecting voicemail greetings, waiting for an appropriate moment to leave a message, and automatically communicating until a call is answered or disconnecting upon encountering an IVR system.

The adaptive voicemail and IVR detection system may incorporate various components, including speech transcription, response classification, decision tree execution, and call logging. These components may work in concert to provide a more natural and efficient automated calling experience.

By utilizing advanced detection algorithms and adaptive timing mechanisms, the system may overcome limitations of traditional fixed-timer or silence-based detection methods. This approach may lead to improved call success rates, more accurate call logging, and enhanced overall performance in automated outbound calling scenarios.

The system may offer customization options, allowing users to configure voicemail handling preferences and potentially support future capabilities such as automated IVR navigation. These features may contribute to a more flexible and adaptable solution for businesses employing AI-driven call automation technologies.

The adaptive voicemail and IVR detection system may comprise several interconnected modules that work in concert to provide efficient and accurate call handling. These modules may include an outbound call initialization module, a speech transcription module, a response classification module, a decision tree execution module, and an adaptive voicemail handling module.

In some cases, the outbound call initialization module may be responsible for initiating the outbound call and activating the voicemail and IVR detection features. This module may interface with the telephony system to place the call and prepare the other components for analysis.

The speech transcription module may convert audio input from the call recipient into text in real-time. This module may utilize speech recognition algorithms to quickly and accurately transcribe the first few seconds of audio, providing a textual basis for further analysis.

Working in tandem with the speech transcription module, the response classification module may analyze the transcribed text to determine whether the audio corresponds to a live recipient, a voicemail greeting, or an IVR system. This classification may be based on various factors such as speech patterns, content, and timing.

Upon receiving the classification result, the decision tree execution module may determine the appropriate course of action. In some cases, if a live recipient is detected, the module may allow the call to proceed normally. If an IVR system is identified, the module may initiate call termination to prevent unproductive interactions. For voicemail detection, the module may activate the adaptive voicemail handling procedures.

The adaptive voicemail handling module may manage the timing and delivery of voicemail messages when a voicemail system is detected. This module may wait for the appropriate moment to begin message playback, ensuring that the voicemail greeting has concluded before initiating the message. In some cases, this module may also handle the generation or selection of appropriate voicemail content based on user-defined settings or AI-generated responses.

These modules may work together in a coordinated manner to process incoming audio, make real-time decisions, and execute appropriate actions. The system may continuously monitor and analyze the call throughout its duration, allowing for dynamic adjustments and ensuring optimal handling of various call scenarios.

The outbound call initialization module may serve as the starting point for the adaptive voicemail and IVR detection system. This module may be responsible for initiating outbound calls and activating the necessary detection features.

In some cases, the outbound call initialization module may interface with a telephony system to place calls. Upon initiating a call, the module may perform a series of checks to determine the appropriate handling for the call.

The module may first verify whether the call is indeed outbound. This determination may be crucial for activating the appropriate detection mechanisms, as inbound calls may require different handling procedures.

Following the outbound call confirmation, the module may check whether voicemail detection is enabled for the current call. This setting may be configurable by users or system administrators, allowing for flexibility in call handling based on specific business needs or preferences.

If voicemail detection is enabled, the module may activate the speech transcription and response classification components. These components may work in tandem to analyze the audio input from the call recipient.

In some cases, the outbound call initialization module may pass control to an Answering Machine Detection (AMD) Manager. The AMD Manager may oversee the process of distinguishing between live recipients, voicemail systems, and IVR menus.

The system may employ a LLama-3 model for detecting whether the call has reached an IVR system, a voicemail, or a live response. This advanced language model may analyze the transcribed audio input to make accurate classifications.

Before activating the LLama-3 model, the system may confirm that no audio is queued to be played. This check may help prevent false classifications due to system-generated audio interfering with the detection process.

The outbound call initialization module may also set up the necessary state management for the call. This may include preparing the system to handle different scenarios based on the detection results, such as transitioning to voicemail message delivery or call termination in case of IVR detection.

In some implementations, the module may initialize a timer or counter to track the duration of the initial audio analysis. For example, the system may be configured to analyze the first 4-5 seconds of audio input from the recipient before making a classification decision.

The outbound call initialization module may also prepare the system for potential dynamic adjustments during the call. This may include setting up mechanisms to pause or resume the AI agent's speech flow based on the detection results and subsequent actions taken.

By effectively managing the initial stages of the outbound call process, this module may set the foundation for accurate voicemail and IVR detection, ultimately contributing to more efficient and natural automated call interactions.

The adaptive voicemail and IVR detection system may include a speech transcription module designed to convert audio input from call recipients into text in real-time. This module may play a crucial role in enabling rapid analysis and classification of the call type.

In some cases, the speech transcription module may utilize Google's speech-to-text technology to perform real-time transcription. This advanced speech recognition system may allow for quick and accurate conversion of spoken words into written text, enabling further analysis by other components of the system.

The speech transcription module may be configured to focus on the initial 4-5 seconds of audio input from the call recipient. This timeframe may be sufficient to capture key information for determining whether the call has reached a live person, a voicemail system, or an IVR menu.

During operation, the speech transcription module may encounter various types of audio inputs. For example, the module may process a live person's greeting, such as "Hello, this is John speaking." In the case of a voicemail system, the module may transcribe a message like "You've reached the voicemail of Jane Doe. Please leave a message after the tone." For an IVR system, the transcription may include menu options, such as "For sales, press 1. For customer service, press 2."

The speech transcription module may work continuously during the initial seconds of the call, providing a stream of transcribed text to other components of the system. This real-time processing may allow for quick decision-making and appropriate call handling based on the detected response type.

In some implementations, the speech transcription module may be capable of handling various audio qualities and background noise levels. This capability may help ensure accurate transcription across different call scenarios, such as calls to mobile phones, landlines, or office phone systems.

The module may also be designed to recognize and transcribe different languages or accents, depending on the specific deployment requirements of the adaptive voicemail and IVR detection system. This multilingual capability may enhance the system's versatility and applicability across diverse markets and user bases.

By leveraging Google's speech-to-text technology, the speech transcription module may benefit from ongoing improvements and updates to the underlying speech recognition algorithms. This may result in continually enhanced transcription accuracy and performance over time, without requiring significant changes to the module itself.

The adaptive voicemail and IVR detection system may include a response classification module designed to analyze speech patterns and classify the response as a live recipient, voicemail greeting, or IVR system. This module may work in conjunction with the speech transcription module to process and interpret the audio input from the call recipient.

In some cases, the response classification module may utilize advanced natural language processing techniques to analyze the transcribed text and identify key characteristics indicative of different response types. The module may examine factors such as sentence structure, word choice, and common phrases associated with various call scenarios.

The response classification module may be configured to wait for four transcriptions before making a classification decision. This approach may allow the system to gather sufficient information to make an accurate determination while still maintaining rapid response times. By waiting for multiple transcriptions, the module may be able to account for variations in speech patterns and potential transcription errors.

For live recipient classification, the module may look for indicators of human interaction, such as personalized greetings or dynamic responses. For example, the module may identify phrases like "Hello, this is John speaking" or "How may I help you?" as strong indicators of a live person answering the call.

In the case of voicemail greeting classification, the module may search for common voicemail phrases and structures. This may include detecting phrases such as "You've reached the voicemail of . . . " or "Please leave a message after the tone." The module may also consider the length and consistency of the greeting as potential indicators of a voicemail system.

For IVR system classification, the response classification module may identify menu-like structures and automated prompts. This may involve detecting phrases like "For sales, press 1" or "Please select from the following options." The module may also consider the presence of numbered options or department listings as indicators of an IVR system.

In some implementations, the response classification module may employ machine learning algorithms to improve its classification accuracy over time. These algorithms may be trained on large datasets of transcribed calls, allowing the module to recognize subtle patterns and nuances in different types of responses.

The module may also be designed to handle edge cases and ambiguous scenarios. For example, if a live recipient answers with a greeting that sounds similar to a voicemail message, the module may use additional context clues or wait for further interaction before making a final classification.

By accurately classifying the response type, the response classification module may enable the adaptive voicemail and IVR detection system to take appropriate actions, such as engaging in conversation with a live recipient, leaving a voicemail message, or terminating the call in the case of an IVR system.

The adaptive voicemail and IVR detection system may include a decision tree execution module designed to determine the appropriate course of action based on the classification result provided by the response classification module. This module may play a crucial role in directing the flow of the call and ensuring efficient handling of various scenarios.

In some cases, the decision tree execution module may receive the classification result indicating whether the call has reached a live recipient, a voicemail system, or an IVR menu. Based on this input, the module may execute a series of predefined decision paths to guide the subsequent actions of the system.

When the classification result indicates a live recipient, the decision tree execution module may allow the call to proceed normally. This may involve activating the AI agent's conversation flow, enabling it to engage in dialogue with the live person. The module may prepare the system to listen for responses, process natural language input, and generate appropriate replies based on the context of the call.

In cases where the classification result identifies a voicemail system, the decision tree execution module may initiate the voicemail handling procedures. This may involve checking user-defined voicemail settings to determine whether leaving a message is permitted. If voicemail messages are enabled, the module may activate the adaptive voicemail handling component, preparing it to deliver the message at the appropriate time.

When the classification result indicates an IVR system, the decision tree execution module may trigger an immediate call termination sequence. This action may help prevent unproductive interactions and conserve system resources. The module may initiate the necessary steps to end the call gracefully and update the call logs with the appropriate disposition.

In an implementation, the decision tree execution module may trigger an automated IVR-handling system begins with a programmable telephony layer-typically a SIP or WebRTC gateway—that can originate or receive calls and inject or capture dual-tone multi-frequency (DTMF) signals and raw audio packets. On top of this sits a call-control engine that runs a finite-state model of the IVR tree. At each state, the engine uses either prerecorded DTMF sequences or a text-to-speech/automatic-speech-recognition (TTS/ASR) pair to answer voice prompts that demand natural-language input. Real-time signal analysis modules monitor call-progress tones, line latency, and voice-energy envelopes to detect when a prompt finishes, when the IVR shifts menus, or when a live agent picks up. When ASR confidence is low, a fallback heuristic reverts to brute-force DTMF patterns ("0", "#", or ** operator hotkeys) while a machine-learned policy model-trained on thousands of past call traces-predicts the shortest path to a human based on menu wording, prompt duration, and prior success rates.

Once the system detects human speech that differs acoustically from synthesized prompts (using speaker-embedding classifiers and timing profiles), it triggers a handoff routine: audio is bridged to a human operator or to a customer-service bot with full conversational AI, and the telephony session metadata (IVR path taken, elapsed time, recognized menu labels) is passed along via a REST callback. A watchdog process maintains an RTP heartbeat and can renegotiate codecs mid-call to avoid carrier side-band drops, while a compliance layer logs all DTMF and speech events with millisecond timestamps for audit. The result is a fully automated agent that navigates proprietary IVRs at machine speed yet exits gracefully the moment a real person comes on the line.

The decision tree execution module may also be designed to handle more complex scenarios, such as hybrid greetings that transition from voicemail to IVR prompts. In these cases, the module may employ a more nuanced decision-making process. For example, if the initial classification suggests a voicemail system but subsequent analysis detects IVR-like prompts, the module may reassess the situation and adjust its course of action accordingly.

In some implementations, the decision tree execution module may incorporate user-defined rules or preferences to customize its behavior. This may allow businesses to tailor the system's responses to specific scenarios based on their unique requirements or industry-specific needs.

The module may also be capable of handling edge cases or uncertain classifications. For instance, if the response classification module provides a low-confidence result, the decision tree execution module may implement additional verification steps or default to a conservative action to minimize potential errors.

By effectively managing the decision-making process based on call classification results, the decision tree execution module may enable the adaptive voicemail and IVR detection system to handle a wide range of call scenarios efficiently and appropriately.

The adaptive voicemail and IVR detection system may include an adaptive voicemail handling module designed to manage the timing and delivery of voicemail messages when a voicemail system is detected. This module may work in conjunction with other components of the system to ensure efficient and natural voicemail interactions.

In some cases, the adaptive voicemail handling module may first check user-defined voicemail settings to determine the appropriate course of action. These settings may include preferences such as whether to leave a voicemail message, the content of the message, and any specific handling instructions.

The module may employ silence thresholds to determine when a voicemail greeting has finished. By analyzing the audio input for periods of silence, the system may identify the appropriate moment to begin message playback. This approach may help prevent the AI agent from speaking over the greeting or leaving a message prematurely.

In some implementations, the adaptive voicemail handling module may wait for a predefined duration of silence before initiating the voicemail message. For example, the module may wait for a silence period of 1-2 seconds after the last detected speech in the greeting. This waiting period may be adjustable based on user preferences or system settings.

Once the module determines that the greeting has concluded, it may proceed with delivering the voicemail message. The content of this message may be based on user-defined prompts or scripts. Users may have the option to input specific prompts for voicemail messages, allowing for customization based on the context of the call or the target recipient.

The adaptive voicemail handling module may support the use of merge tags for inserting lead information into voicemail messages. These merge tags may allow for personalization of the message by dynamically inserting relevant details such as the recipient's name, company, or other pertinent information stored in the system's database.

For example, a voicemail message template might include merge tags as follows: "Hello [FirstName], this is [Agent-Name] calling from [CompanyName]. I'm reaching out regarding [Topic]." The adaptive voicemail handling module may replace these tags with the appropriate information before delivering the message.

In some cases, the module may offer different voicemail handling methods based on specific scenarios. For instance:

The module may implement a standard voicemail approach where it delivers a pre-defined message after detecting the end of the greeting. Additionally, the system may utilize a dynamic voicemail method where it generates a customized message based on the user-provided prompt and context of the call. Furthermore, if user settings indicate that no message should be left, the module may initiate call termination after detecting the voicemail system, following a no voicemail policy.

The adaptive voicemail handling module may also be capable of adjusting its behavior based on the specific characteristics of the detected voicemail system. For example, if the module encounters a voicemail system with a time limit for messages, it may adjust the delivery speed or content of the message to ensure complete delivery within the allowed timeframe.

In some implementations, the module may include error handling capabilities. If an unexpected event occurs during voicemail delivery, such as sudden background noise or interruption, the module may be able to pause, reassess the situation, and resume message delivery if appropriate.

By incorporating these features and capabilities, the adaptive voicemail handling module may contribute to more natural and effective voicemail interactions within the context of AI-driven call automation systems.

The adaptive voicemail and IVR detection system may include a logging and call status update module designed to record and track the outcomes of each call. This module may play a crucial role in providing detailed insights into call performance and enabling accurate reporting for businesses utilizing the system.

In some cases, the logging and call status update module may record various call dispositions, including additional parameters to indicate whether the call encountered a voicemail system or an IVR menu. These detailed log entries may allow for more nuanced analysis of call outcomes and help businesses optimize their outbound calling strategies.

The module may generate log entries for different call scenarios. For example, when a voicemail message is successfully left, the system may log the outcome as "Voicemail Left." This disposition may indicate that the AI agent detected a voicemail system, waited for the appropriate moment, and delivered the intended message.

In cases where the system encounters an IVR menu, the logging module may record the outcome as "Incomplete-Lead didn't answer the call-IVR." This detailed log entry may provide valuable information about unproductive call attempts, helping businesses understand the frequency of IVR encounters and potentially adjust their calling strategies accordingly.

The logging and call status update module may support various other call dispositions to capture a wide range of outcomes. For example, the system may record a "Live Conversation" disposition indicating a successful connection with a live recipient. When the call is not picked up and no voicemail system is detected, the module may log a "No Answer" disposition. In cases where the system encounters a busy tone, it may record a "Busy Signal" disposition. For situations involving technical issues that prevent call completion, the module may use a "Call Failed" disposition.

In some implementations, the module may include time-stamps with each log entry, allowing for time-based analysis of call outcomes. This feature may help businesses identify optimal calling times or track performance trends over different periods.

The logging and call status update module may also support the inclusion of additional metadata with each log entry. This metadata may include information such as the AI agent used, the specific campaign or sequence associated with the call, or any custom tags defined by the user.

In some cases, the module may provide real-time updates to a user interface or dashboard, allowing businesses to monitor call outcomes as they occur. This real-time logging capability may enable quick adjustments to ongoing campaigns or immediate follow-up actions based on call results.

The logging and call status update module may be designed to integrate with other business intelligence or customer relationship management (CRM) systems. This integration may allow for seamless transfer of call outcome data to other platforms, enabling comprehensive analysis and reporting across various business tools.

By providing detailed and accurate call logging capabilities, the logging and call status update module may contribute to improved decision-making, more effective campaign management, and enhanced overall performance of AI-driven outbound calling systems.

The adaptive voicemail and IVR detection system may integrate various modules and components to perform its overall function of efficiently handling outbound calls. This integration may involve a complex flow of information and decision-making processes that work together to provide accurate detection and appropriate responses to different call scenarios.

In some cases, the system may utilize Twilio for phone integration, employing websockets to stream audio data in both directions. This approach may allow for real-time processing of audio input and output, enabling rapid detection and response capabilities.

The outbound call initialization module may initiate the call process by interfacing with Twilio to place the outbound call. Once the call is connected, the websocket stream may begin transmitting audio data to the speech transcription module. This module may then convert the incoming audio into text in real-time, providing a continuous stream of transcribed content for analysis.

As the speech transcription module processes the audio, the response classification module may analyze the transcribed text to determine whether the call has reached a live recipient, a voicemail system, or an IVR menu. This classification process may involve examining multiple transcriptions to ensure accuracy before making a determination.

Upon receiving the classification result, the decision tree execution module may determine the appropriate course of action. If a live recipient is detected, the module may allow the call to proceed normally, potentially activating an AI agent for conversation. In the case of a voicemail system, the module may initiate the adaptive voicemail handling procedures. For IVR detection, the module may trigger an immediate call termination sequence.

If the decision tree execution module determines that a voicemail message should be left, the adaptive voicemail handling module may take control. This module may analyze the audio stream to detect the end of the voicemail greeting, waiting for an appropriate moment to begin message playback. Once the right moment is identified, the module may send the voicemail message back through the Twilio websocket stream for delivery.

Throughout the call process, the logging and call status update module may record various events and outcomes. This module may capture details such as call duration, detection results, and final dispositions, providing valuable data for analysis and reporting.

The websocket integration with Twilio may allow for near real-time audio processing and response generation. As audio data is received through the websocket, the system may quickly analyze and make decisions, sending responses back through the same channel with minimal latency. This bidirectional streaming capability may enable the system to adapt rapidly to changing call conditions and provide timely responses.

In some implementations, the system may employ state management techniques to coordinate the activities of different modules. For example, when transitioning from initial detection to voicemail message delivery, the system may update its internal state to ensure all components are aligned and ready for the next phase of the call.

The integration of these modules and components through the Twilio websocket stream may create a cohesive system capable of handling complex call scenarios efficiently. By leveraging real-time audio processing, rapid decision-making, and adaptive response mechanisms, the system may provide a seamless and effective solution for automated outbound calling.

The adaptive voicemail and IVR detection system may comprise multiple interconnected modules, each responsible for specific technical features and tasks. These modules may work in concert to support the overall functionality of the system and execute the necessary steps of the detection and handling method.

In some cases, the system may include a call initialization module, a speech processing module, a classification module, a decision-making module, and a response generation module. Each of these modules may perform specialized functions that contribute to the efficient operation of the adaptive voicemail and IVR detection system.

The call initialization module may be responsible for establishing the outbound call connection and preparing the system for audio analysis. This module may interface with telephony services to initiate the call and activate the necessary detection features. In some implementations, the call initialization module may also handle initial call setup parameters, such as enabling or disabling specific detection capabilities based on user preferences or system settings.

A speech processing module may be employed to convert incoming audio signals into text format for analysis. This module may utilize advanced speech recognition algorithms to perform real-time transcription of the audio stream. The speech processing module may be designed to handle various audio qualities, accents, and background noise levels, ensuring accurate transcription across different call scenarios.

The classification module may analyze the transcribed text to determine whether the call has reached a live recipient, a voicemail system, or an IVR menu. This module may employ natural language processing techniques and machine learning algorithms to identify key patterns and characteristics associated with each call type. In some cases, the classification module may consider multiple factors, such as speech patterns, content, and timing, to make accurate determinations.

A decision-making module may be responsible for determining the appropriate course of action based on the classification results. This module may execute predefined decision trees or algorithms to guide the system's response to different call scenarios. The decision-making module may also incorporate user-defined rules or preferences to customize its behavior according to specific business requirements.

The response generation module may handle the creation and delivery of appropriate responses based on the decisions made by the decision-making module. For voicemail scenarios, this module may manage the timing and content of voicemail messages. In cases of live recipients, the response generation module may activate conversational AI capabilities to engage in dialogue. When IVR systems are detected, this module may initiate call termination procedures.

In some implementations, the system may also include a logging and analytics module. This module may be responsible for recording call outcomes, tracking performance metrics, and generating reports. The logging and analytics module may provide valuable insights into system performance and help identify areas for improvement or optimization.

These modules may communicate and interact with each other through well-defined interfaces, allowing for efficient data exchange and coordinated operation. The modular architecture of the system may enable flexibility in deployment and maintenance, as individual modules can be updated or replaced without affecting the entire system.

By leveraging this multi-module approach, the adaptive voicemail and IVR detection system may achieve a high degree of functionality and adaptability. The specialized modules may work together to handle complex call scenarios, make intelligent decisions, and provide appropriate responses, ultimately enhancing the efficiency and effectiveness of automated outbound calling operations.

The adaptive voicemail and IVR detection system may incorporate artificial intelligence (AI) and machine learning (ML) techniques to enhance various components and improve overall system performance. These advanced technologies may be applied to multiple aspects of the system, enabling more accurate detection, classification, and response generation.

In some cases, the speech processing module may utilize deep learning models for speech recognition and transcription. These models may be trained on large datasets of diverse audio samples, allowing them to accurately transcribe speech across different accents, languages, and audio qualities. The use of AI in speech processing may result in faster and more accurate transcriptions, potentially reducing errors and improving the system's ability to handle complex audio inputs.

The classification module may employ machine learning algorithms to determine whether a call has reached a live recipient, a voicemail system, or an IVR menu. In some implementations, this module may use natural language processing (NLP) techniques combined with supervised learning models. These models may be trained on labeled datasets of call transcripts, enabling them to identify patterns and features associated with different call types. Over time, the classification module may improve its accuracy through continuous learning, adapting to new patterns and variations in call scenarios.

In some cases, the decision-making module may incorporate reinforcement learning techniques to optimize its decision trees and response strategies. This approach may allow the system to learn from past interactions and outcomes, refining its decision-making processes to maximize desired results, such as successful call completions or voicemail deliveries. The reinforcement learning model may consider various factors, including call context, historical performance, and user-defined preferences, to make more informed decisions.

The response generation module may benefit from the integration of generative AI models. These models may be used to create more natural and context-appropriate responses for voicemail messages or live conversations. In some implementations, the system may employ large language models fine-tuned on domain-specific data to generate responses that align with the business's communication style and objectives. The use of AI in response generation may enable more dynamic and personalized interactions, potentially improving engagement and call outcomes.

The adaptive voicemail handling module may utilize machine learning algorithms to optimize the timing of message delivery. These algorithms may analyze patterns in voicemail greetings, silence durations, and background noise levels to determine the most appropriate moment to begin message playback. By learning from successful and unsuccessful delivery attempts, the system may continually refine its timing strategies, potentially reducing instances of premature or delayed message delivery.

In some cases, the logging and analytics module may incorporate predictive analytics and anomaly detection algorithms. These AI-driven techniques may help identify trends, patterns, and potential issues in call performance data. The system may use these insights to proactively adjust its behavior, optimize resource allocation, or alert administrators to unusual activity or performance degradation.

The system may also employ ensemble learning techniques, combining multiple AI models to improve overall performance and robustness. For example, the classification module may use an ensemble of different classifiers, each specializing in detecting specific call types or characteristics. The outputs of these individual classifiers may be aggregated to make more accurate and reliable classifications.

In some implementations, the system may utilize transfer learning techniques to adapt pre-trained AI models to specific business domains or use cases. This approach may allow for faster deployment and customization of the system, as the models can leverage knowledge gained from broader datasets while fine-tuning to the specific patterns and requirements of individual businesses.

The AI and machine learning components of the system may be designed with explainability and interpretability in mind. In some cases, the system may incorporate techniques such as SHAP (SHapley Additive explanations) values or LIME (Local Interpretable Model-agnostic Explanations) to provide insights into the decision-making processes of the AI models. This explainability may help build trust in the system and facilitate debugging or refinement of the AI components.

By incorporating these AI and machine learning techniques, the adaptive voicemail and IVR detection system may achieve higher levels of accuracy, efficiency, and adaptability. The integration of these advanced technologies across various system components may enable more intelligent and context-aware handling of outbound calls, potentially leading to improved performance and user satisfaction.

The adaptive voicemail and IVR detection system may incorporate various artificial intelligence (AI) and machine learning (ML) architectures to enhance its performance and capabilities. These architectures may be designed to handle specific tasks within the system, such as speech recognition, classification, and decision-making.

The classification module may employ a combination of natural language processing (NLP) techniques and supervised learning models. In some implementations, this module may use an ensemble of classifiers, including bidirectional LSTM networks for sequence modeling and attention mechanisms to focus on relevant parts of the transcription. The module may also incorporate a Gradient Boosting Decision Tree (GBDT) algorithm such as XGBoost or LightGBM to combine features extracted from the text with acoustic features such as speech rate, pause patterns, and prosodic information. The training data for these models may consist of at least 50,000 labeled call transcripts, annotated with their corresponding call types (live recipient, voicemail, or IVR), with balanced representation across different categories to prevent classification bias.

For the decision-making component, the system may incorporate reinforcement learning techniques. In some cases, this may involve the use of deep Q-networks (DQNs) or proximal policy optimization (PPO) algorithms. These models may be trained through simulated interactions with a reward function that assigns positive values for correct handling decisions (e.g., successfully leaving a voicemail at the appropriate time) and negative values for incorrect decisions (e.g., speaking over a greeting or misclassifying a call type). The training environment may include a variety of simulated call scenarios based on at least 10,000 real-world call recordings to ensure robustness and generalization. The reinforcement learning model may be initialized with supervised pretraining on expert demonstrations before transitioning to online learning from real interactions.

The response generation module may utilize generative AI models, such as a transformer-based architecture like GPT-3.5 or a fine-tuned LLAMA model. These models may be pre-trained on large corpora of text data (at least 100 GB of text) and then fine-tuned on domain-specific datasets containing at least 100,000 examples of appropriate voicemail messages and business communications. The training process may involve techniques such as teacher forcing during initial training phases and minimum risk training to optimize for specific business metrics. The model may be fine-tuned using a combination of maximum likelihood estimation and reinforcement learning from human feedback (RLHF) to ensure the generated responses align with business communication standards and effectiveness goals.

In some implementations, the system may employ federated learning techniques to continuously improve its models while maintaining data privacy. This approach may allow the system to learn from distributed datasets across multiple clients or locations without centralizing sensitive call data. The federated learning process may use secure aggregation protocols and differential privacy techniques with a privacy budget ($\epsilon$) of less than 1.0 to protect individual call data while still enabling model improvements.

The training data requirements for the AI and ML components may vary depending on the specific task and model architecture. For speech recognition, this may include thousands of hours of transcribed audio across various acoustic conditions, with at least 500 hours specifically focused on telephone-quality audio. Classification models may require tens of thousands of labeled call transcripts with at least 5,000 examples of each call type (live person, voicemail, IVR), while response generation models may need millions of examples of human-generated responses in relevant contexts, including at least 10,000 professionally crafted voicemail messages.

To optimize the AI and ML models, the system may employ various techniques such as Bayesian hyperparameter optimization, L1/L2 regularization, and early stopping with a patience parameter of 5-10 epochs. In some cases, automated machine learning (AutoML) approaches such as Neural Architecture Search (NAS) may be used to efficiently search for optimal model architectures and hyperparameters. The optimization process may also involve knowledge distillation, where smaller, more efficient models with 10-50 million parameters are trained to mimic the behavior of larger, more complex models with billions of parameters, achieving 90-95% of the performance while reducing inference latency to under 100 ms.

The system may implement continuous learning mechanisms to adapt to changing patterns and improve performance over time. This may involve periodic retraining of models using newly collected data, as well as online learning techniques for real-time adaptation with a learning rate decay schedule that starts at 1e-4 and decreases by a factor of 0.1 every 10,000 examples. In some implementations, the system may use active learning strategies with uncertainty sampling to identify and prioritize the most informative samples for model updates, potentially reducing the amount of labeled data required for ongoing improvements by up to 60% compared to random sampling approaches.

To ensure the reliability and robustness of the AI and ML components, the system may incorporate techniques for uncertainty quantification and out-of-distribution detection. These methods may include Monte Carlo dropout with 10-20 forward passes to estimate prediction uncertainty, ensemble disagreement metrics, and density-based anomaly detection algorithms such as Isolation Forest or Local Outlier Factor. These approaches may help identify cases where the models may be less confident in their predictions, allowing for fallback strategies or human intervention when the confidence score falls below a threshold of 0.7.

In some cases, the system may utilize explainable AI techniques to provide insights into the decision-making processes of the models. This may include methods such as SHAP (SHapley Additive explanations) values or LIME (Local Interpretable Model-agnostic Explanations) to generate human-interpretable explanations for model outputs. For the classification module, feature importance scores may be calculated to identify the most influential factors in determining call types, with attention visualization techniques highlighting the specific phrases or acoustic patterns that triggered a particular classification decision. These explanations may be useful for debugging, auditing, and building trust in the system's capabilities.

The AI and ML architectures within the adaptive voicemail and IVR detection system may be designed with scalability and modularity in mind. The system may employ a microservices architecture with containerized ML models that can be independently scaled based on demand, with horizontal scaling capabilities to handle up to 1,000 concurrent calls. Model serving may utilize optimized inference engines such as ONNX Runtime or TensorRT to achieve low-latency predictions, with model quantization techniques reducing memory requirements by up to 75% while maintaining accuracy within 2% of full-precision models. This approach may allow for easier updates and replacements of individual components as new techniques and models become available, ensuring that the system can evolve and improve over time.

The adaptive voicemail and IVR detection system may be utilized in various scenarios to enhance the efficiency and effectiveness of outbound calling operations. In some cases, a comprehensive example of a user employing the system may illustrate how each module contributes to the overall process and outcome of a call.

A real estate agent may configure the system to make outbound calls to potential clients. The agent may set up a campaign within the system's user interface, specifying call parameters such as the target phone numbers, preferred calling times, and desired outcomes.

When initiating an outbound call, the call initialization module may interface with the telephony service to place the call. As the call connects, the speech processing module may begin analyzing the audio stream in real-time, converting the incoming audio to text for further analysis.

In some cases, the classification module may examine the transcribed text to determine the nature of the call recipient. For example, if the module detects a greeting such as "Hello, you've reached John Smith. I'm not available right now . . . ", the system may classify this as a voicemail greeting.

Upon receiving the classification result, the decision-making module may determine the appropriate course of action. In this scenario, where a voicemail system is detected, the module may activate the adaptive voicemail handling procedures.

The adaptive voicemail handling module may then wait for an appropriate moment to begin message playback. This module may analyze the audio stream for periods of silence, indicating that the voicemail greeting has concluded. Once a suitable pause is detected, the response generation module may deliver a pre-recorded or dynamically generated voicemail message.

Throughout the call process, the logging and analytics module may record various events and outcomes. In some cases, this module may capture details such as call duration, detection results, and the final disposition of the call.

The system may display the voicemail and IVR detection results in the user interface, providing the real estate agent with real-time insights into the call outcomes. The interface may show information such as whether a voicemail was successfully left, if an IVR system was encountered, or if a live conversation took place.

In some implementations, the user interface may present detailed analytics and performance metrics. For example, the real estate agent may be able to view the percentage of calls that reached voicemail systems, the number of successful message deliveries, and the frequency of IVR encounters. This information may help the agent refine their outbound calling strategy and optimize their use of the system.

The adaptive voicemail and IVR detection system may continue to process calls in this manner, handling various scenarios such as live recipients, different voicemail systems, and IVR menus. By leveraging its AI and machine learning capabilities, the system may adapt to new patterns and improve its performance over time, potentially enhancing the efficiency of the real estate agent's outbound calling efforts.

The adaptive voicemail and IVR detection system may offer several technical advantages over traditional outbound calling systems. In some cases, the system's ability to accurately classify call recipients in real-time may lead to significant improvements in call handling efficiency and resource utilization.

One technical advantage may be the reduction of wasted time and resources on unproductive call attempts. By quickly identifying voicemail systems and IVR menus, the system may avoid scenarios where an AI agent might otherwise engage in lengthy, one-sided conversations or become trapped in automated menu loops. This efficiency may translate to a higher number of productive calls within a given timeframe, potentially increasing the overall effectiveness of outbound calling campaigns.

The system's adaptive voicemail handling capabilities may provide another technical advantage. By analyzing audio streams for optimal message delivery timing, the system may increase the likelihood of successful voicemail message placement. For example, the adaptive voicemail handling module may detect subtle variations in voicemail greeting lengths and adjust its behavior accordingly, waiting for the appropriate moment to begin message playback. This adaptability may result in fewer truncated or prematurely delivered messages, potentially improving the quality of communication with potential clients or customers.

In some implementations, the system's use of advanced AI and machine learning techniques may offer a technical advantage in terms of continuous improvement and adaptability. The classification module, utilizing ensemble learning techniques and natural language processing, may become increasingly accurate over time as it encounters a wider variety of call scenarios. For instance, the system may learn to recognize new patterns in voicemail greetings or IVR menu structures, allowing it to make more nuanced classifications and decisions.

The real-time speech processing capabilities of the system may provide a technical advantage in terms of responsiveness and natural interaction. By quickly transcribing and analyzing incoming audio, the system may make rapid decisions about call classification and appropriate responses. This speed may be particularly advantageous in scenarios where live recipients are encountered, as the system can seamlessly transition to interactive conversation modes without noticeable delays.

The system's modular architecture and scalability may offer technical advantages in terms of customization and future-proofing. For example, businesses may be able to easily integrate new AI models or update existing components without overhauling the entire system. This flexibility may allow the system to adapt to evolving telecommunication technologies and changing business needs over time.

In some cases, the system's comprehensive logging and analytics capabilities may provide technical advantages in terms of performance optimization and compliance. The detailed call records and performance metrics generated by the system may allow businesses to gain deeper insights into their outbound calling operations. For instance, a company may use this data to identify patterns in successful calls, optimize calling schedules, or demonstrate compliance with telecommunication regulations.

The system's ability to handle complex decision-making processes may offer technical advantages in navigating diverse call scenarios. For example, the decision tree execution module may be capable of managing nuanced situations, such as hybrid voicemail-IVR systems or unconventional greeting patterns. This sophisticated decision-making may result in more appropriate and effective call handling across a wide range of scenarios, potentially improving overall call outcomes and customer experiences.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for adaptive outbound call handling, the method comprising:

capturing, with at least one processor, audio of a voice call established between a calling system and a called endpoint and dividing the audio into successive frames;

assigning, by the at least one processor, a speech-recognition confidence value to each frame and discarding frames having confidence values below a configurable threshold prior to further processing;

verifying, by the at least one processor, that a transmission queue is free of system-generated outbound audio and, upon that verification, converting remaining frames into text and classifying the voice call as voicemail, interactive voice response, or live human speech by executing a machine-learning language model on the text;

selecting, by the at least one processor in dependence on the classification, a corresponding call-handling action;

when the classification identifies the interactive voice-response state, generating, by the at least one processor and in real time, control inputs derived from a stored menu-navigation policy that at least maps recognised menu wording to dual-tone-multi-frequency sequences, updates the mapping in response to menu transitions detected in the inbound audio, and continues to issue updated control inputs until detection of live-speaker pickup; and executing, by the at least one processor, the selected call-handling action, the call-handling action further comprising delivering a prerecorded voicemail message when the classification identifies the voicemail state and continuing conversational interaction when the classification identifies the live-speaker state.

2. The method of claim 1, wherein the configurable threshold for discarding frames is adjustable based on ambient noise levels detected in the audio.

3. The method of claim 1, wherein converting remaining frames into text comprises using a speech-to-text engine trained on telephony audio data.

4. The method of claim 1, wherein the machine-learning language model is a transformer-based model fine-tuned on labeled examples of voicemail greetings, IVR prompts, and live human speech.

5. The method of claim 1, further comprising logging call outcomes and updating the stored menu-navigation policy based on successful navigation patterns.

6. The method of claim 1, wherein the control inputs for interactive voice response navigation include DTMF tones and synthesized speech responses.

7. The method of claim 1, further comprising detecting silence periods in the audio and using the detected silence periods to determine appropriate timing for delivering the prerecorded voicemail message.

8. The method of claim 1, wherein continuing conversational interaction comprises activating a natural language processing module to engage in dialogue with the live speaker.

9. The method of claim 1, further comprising updating the classification in real-time as the call progresses, allowing for dynamic switching between call-handling actions.

10. A system for adaptive outbound call handling, comprising:

at least one processor; and a memory storing instructions that, when executed by the at least one processor, cause the system to:

capture audio of a voice call established between a calling system and a called endpoint and divide the audio into successive frames;

assign a speech-recognition confidence value to each frame and discard frames having confidence values below a configurable threshold prior to further processing;

verify that a transmission queue is free of system-generated outbound audio and, upon that verification, convert remaining frames into text and classify the voice call as voicemail, interactive voice response, or live human speech by executing a machine-learning language model on the text;

select, in dependence on the classification, a corresponding call-handling action;

when the classification identifies the interactive voice-response state, generate, in real time, control inputs derived from a stored menu-navigation policy that at least maps recognised menu wording to dual-tone-multi-frequency sequences, updates the mapping in response to menu transitions detected in the inbound audio, and continues to issue updated control inputs until detection of live-speaker pickup; and execute the selected call-handling action, the call-handling action further comprising delivering a prerecorded voicemail message when the classification identifies the voicemail state and continuing conversational interaction when the classification identifies the live-speaker state.

11. The system of claim 10, further comprising a telephony interface for establishing the voice call with the called endpoint.

12. The system of claim 10, wherein the memory further stores a database of prerecorded voicemail messages selectable based on call context.

13. The system of claim 10, further comprising a user interface for configuring the stored menu-navigation policy.

14. A non-transitory computer-readable storage medium storing instructions that, when executed by at least one processor of a computing system, cause the computing system to:

capture audio of a voice call established between a calling system and a called endpoint and divide the audio into successive frames;

assign a speech-recognition confidence value to each frame and discard frames having confidence values below a configurable threshold prior to further processing;

verify that a transmission queue is free of system-generated outbound audio and, upon that verification, convert remaining frames into text and classify the voice call as voicemail, interactive voice response, or live human speech by executing a machine-learning language model on the text;

select, in dependence on the classification, a corresponding call-handling action;

when the classification identifies the interactive voice-response state, generate, in real time, control inputs derived from a stored menu-navigation policy that at least maps recognised menu wording to dual-tone-multi-frequency sequences, updates the mapping in response to menu transitions detected in the inbound audio, and continues to issue updated control inputs until detection of live-speaker pickup; and execute the selected call-handling action, the call-handling action further comprising delivering a prerecorded voicemail message when the classification identifies the voicemail state and continuing conversational interaction when the classification identifies the live-speaker state.

15. The non-transitory computer-readable storage medium of claim 14, wherein the instructions further cause the computing system to perform real-time analytics on call outcomes and adjust call-handling strategies based on the analytics.

* * * * *